Patented Dec. 22, 1936

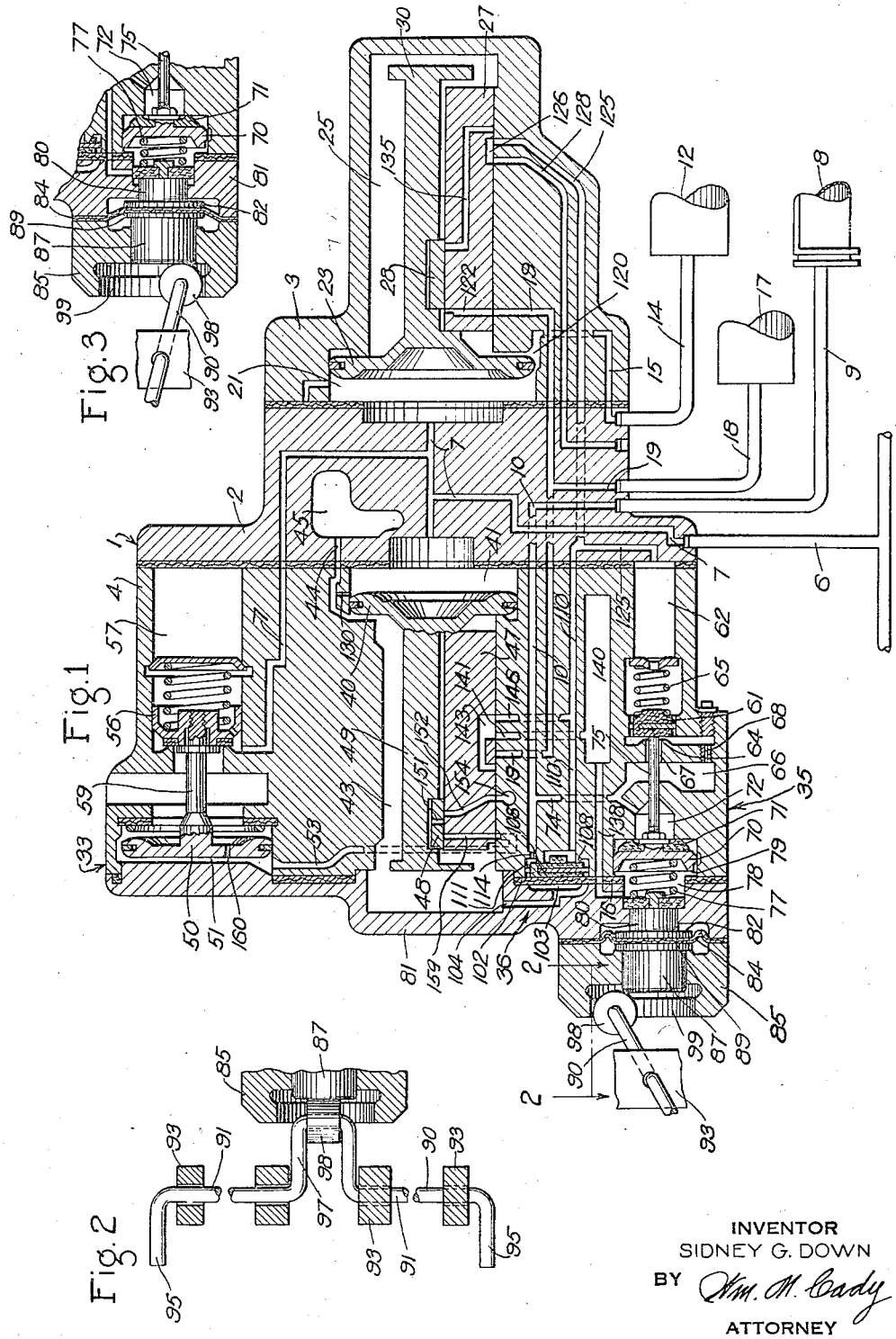

2,065,214

UNITED STATES PATENT OFFICE 2,065,214

FLUID PRESSURE BRAKE

Sidney G. Down, Edgewood, Pa., assignor to The Westinghouse Air Brake Company, Wilmerding, Pa., a corporation of Pennsylvania Application October 4, 1935, Serial No. 43,519

6 Claims. (Cl. 303—35)

This invention relates to a fluid pressure brake equipment in which the brakes are applied and released by varying the fluid pressure in the brake pipe.

It has heretofore been proposed to provide a braking equipment of the above type in which, in effecting an emergency application of the brakes, fluid under pressure is initially supplied to the brake cylinder at a rapid rate until the pressure of the fluid in the brake cylinder has increased to a value sufficient to cause the brake shoes to engage the wheels, after which the rate at which fluid is supplied to the brake cylinder is reduced for a period of time sufficient to insure that the brakes will be applied on all of the cars of the train before the brakes have been applied on the cars at the head end of the train with such force in advance of the brakes on the cars at the rear end of the train as to result in a running in of the slack in the train at such a rate that excessive shocks will be produced. After this brake cylinder build up delay period, and after the slack has run in, the rate of supply of fluid in the brake cylinder is increased so that the pressure of the fluid in the brake cylinder builds up at a rapid rate.

A fluid pressure brake equipment having the above feature, by which in an emergency application of the brakes there is an initial inshot of fluid under pressure to the brake cylinder, followed by a slow build up of brake cylinder pressure to the brake cylinder, is disclosed in the United States Patent No. 2,031,213 to Clyde C. Farmer.

In the brake equipment shown in the above identified patent a restriction in the rate of flow of fluid to the brake cylinder is produced by valve means, which during an emergency application of the brakes, is controlled by an abutment subject to the pressure of the fluid supplied to the brake cylinder, and which operates on a predetermined increase in the pressure of the fluid supplied to the brake cylinder to close the passage controlled by said valve means, and thus reduce the rate of flow of fluid to the brake cylinder.

In addition, in the equipment shown in the above-identified patent the increase in the rate of flow of fluid to the brake cylinder following the brake cylinder build-up delay period is produced by valve means controlled by the opposing pressures of the fluid supplied to the brake cylinder and the pressure of the fluid in the slide valve chamber of the emergency portion of the valve device, and which operates on an increase in the pressure of the fluid in the brake cylinder to open a communication through which fluid may be supplied to the brake cylinder.

It has been found that it may be desirable in some classes of service, such as in relatively short trains where the run in of slack is less serious than in long trains, to eliminate the brake cylinder build-up delay period.

It is the principal object of my invention to provide a brake controlling valve device having means adapted to restrict the rate of flow of fluid to the brake cylinder following an increase in the pressure of the fluid in the brake cylinder to a predetermined value, together with optionally operable means for rendering the last named means inoperative.

A further object of the invention is to provide a brake controlling valve device having means subject to and operated upon a predetermined increase in the pressure of the fluid supplied to the brake cylinder for reducing the rate of flow of fluid to the brake cylinder, together with optionally operable means for rendering said means inoperative.

Another object of the invention is to provide a brake controlling valve device having means subject to and operated upon a predetermined increase in the pressure of the fluid supplied to the brake cylinder for reducing the rate of flow of fluid to the brake cylinder, other valve means subject to the pressure of fluid supplied to the brake cylinder and normally operated upon an increase in said pressure to a higher predetermined pressure to open a communication through which fluid may be supplied to the brake cylinder, whereby fluid will thereafter be supplied to the brake cylinder at a more rapid rate, and having means to optionally vary the pressure to which the first-named valve means is responsive, whereby said valve means may be maintained inoperative until the pressure of the fluid supplied to the brake cylinder increases to a value sufficient to effect operation of the other of said valve means to open the communication controlled thereby.

Other objects of the invention and features of novelty will be apparent from the following description taken in connection with the accompanying drawing, in which—

Fig. 1 is a diagrammatic view of a fluid pressure brake equipment for a car, including a brake controlling valve device shown in section and embodying my invention, Fig. 2 is a fragmentary sectional view taken substantially along the line 2—2 of Fig. 1, and Fig. 3 is a fragmentary sectional view of a portion of the brake controlling valve device shown in Fig. 1 with the parts shown in a different position than that in which they are shown in Fig. 1.

As shown in the drawing the brake controlling valve device, which is indicated generally by the reference numeral 1, may comprise a pipe bracket section 2, to which is secured a triple valve casing 3, and an emergency valve casing 4. The brake pipe 6 is connected to a passage 7 in the pipe bracket section 2, a brake cylinder 8 is connected by a pipe 9 to a passage 10 in the pipe bracket section 2, an auxiliary reservoir 12 is connected by a pipe 14 to a passage 15, and an emergency reservoir 17 is connected by a pipe 18 to a passage 19.

The triple valve casing 3 has a piston chamber 21 formed therein and this chamber is connected to the brake pipe passage 7 and contains a piston 23. On the opposite side of the piston 23 is a valve chamber 25, which is connected to the auxiliary reservoir passage 15, and which contains a main slide valve 27, and an auxiliary slide valve 28 adapted to be operated by the piston 23 through a piston stem 30.

The emergency valve portion, indicated generally by the reference numeral 4, includes a quick action vent valve device indicated generally by the reference numeral 33, an inshot valve device indicated generally at 35, and a timing valve device indicated generally by the reference character 36.

The emergency valve portion comprises a piston 40 having a piston chamber 41 at one side thereof connected to the brake pipe passage 7, and having on the opposite side a valve chamber 43 connected by way of a passage 44 with a quick action chamber 45.

The valve chamber 43 contains a main slide valve 47 and an auxiliary slide valve 48 adapted to be operated by the piston 40 through the piston stem 49.

The vent valve device, indicated generally at 33, comprises a piston 50 having a piston chamber 51 on one side thereof connected to a passage 53 leading to a port in the seat of the slide valve 47. A vent valve 56 contained in the valve chamber 57 is adapted to be operated by the piston 50 through the piston stem 59.

The inshot valve, indicated generally by the reference character 35, comprises a valve element 61 which is mounted in a chamber 62 and is normally urged into engagement with a seat rib 64 by means of a spring 65 so as to cut off communication between the chamber 62 and a chamber 66 by way of a passage 67. The chamber 62 is constantly connected with the chamber 66 by way of a restricted passage 68.

The inshot valve device 35 also includes a movable abutment 70 having a sealing gasket 71 associated therewith and provided with a seat rib adapted to seat upon a seat formed on the casing 4, said seat surrounding a chamber 72 which is constantly connected with the chamber 66, and also with the brake cylinder passage 10 by way of a passage 74.

The abutment 70 has a stem 75 associated therewith and adapted to operate the valve 61, the stem being of such length as to hold the valve 61 away from the seat rib 64 when the sealing gasket 71 is in engagement with the seat formed on the casing 4.

The movable abutment 70 has a spring 77 associated therewith and normally urging the abutment to the position in which the sealing gasket 71 engages the face of the casing 4. The spring 77 is proportioned so as to exert a greater force on the abutment 70 and the stem 75 than the force exerted by the spring 65 on the valve 61, so that the valve 61 will normally be moved away from the seat rib 64 by the spring 77.

One end of the spring 77 engages a face of a plunger 80 which is mounted in a bore in the casing cover plate 81, and has an enlarged head 82, which engages one face of a flexible diaphragm 84 which is clamped between the casing cover section 81 and a casing section 85.

The head portion 82 in one position of the plunger 80 is adapted to engage the casing cover section 81 to limit movement of the plunger 80 to the right, as viewed in Fig. 1 of the drawing.

The other face of the diaphragm 84 is engaged by a plunger 87 which is mounted in a bore in the casing section 85 and which is provided with an enlarged head portion 89 which engages a portion of the casing section 85 to limit movement of the plunger to the left, as viewed in Fig. 1 of the drawing.

In the brake equipment provided by this invention manually or optionally operated means is provided to move the plungers 80 and 87 from the position in which the head 89 on the plunger 87 is in engagement with the casing section 85, which is the position in which these members are shown in Fig. 1 of the drawing, to the position in which the head 82 of the plunger 80 is substantially in engagement with the casing cover section 81, which is the position in which the plungers are shown in Fig. 3 of the drawing.

The manually or optionally operated means comprises a lever, indicated generally by the reference character 90, and having adjacent opposite ends thereof shaft portions 91 which are rotatably supported by means of spaced brackets 93 which may be secured in any suitable manner, not shown, to the car structure. The ends 95 of the lever 90 extend substantially perpendicularly to the shaft portions 91, and the lever is preferably of such length, and is arranged on a car so that one end 95 is located on one side of the car, while the other end 95 is located on the other side of the car.

The lever 90 has formed thereon intermediate its ends an off-set portion 97 having a rotor 98 rotatably supported thereon and positioned in a recess 99 in the casing section 85 surrounding the exposed end of the plunger 87.

The brackets 93 are preferably arranged so that the axis on which the shaft portion 91 of the lever 90 pivots is disposed substantially in alignment with the center line of the plungers 87 and 80, while the portion of the casing section 85 surrounding the recess 99 is adapted to limit the range of movement of the rotor 98 above and below the plane of the shaft portion 91 of the lever 90, and is arranged so as to permit the rotor 98 to move above this plane a somewhat greater distance than it is permitted to move below this plane.

The timing valve device 36 comprises a flexible diaphragm 102, which is subject on one side to the pressure of the fluid in a chamber 103 which is connected with the slide valve chamber 43 by way of a passage 104.

A valve 106 is positioned in a chamber 111 on the opposite side of the diaphragm 102, and is normally held in engagement with a seat rib 108 surrounding the end of a passage 110 so as to cut off communication between the passage 110 and the chamber 111 in which the valve 106 is mounted, and which is in constant communication with the brake cylinder passage 10 by way of a restricted passage 114.

In operation the brake pipe 6 is supplied with fluid under pressure and fluid flows therefrom through the passage 7 to the piston chamber 21, moving the piston 23 to the release position, if it is not already in that position, which is the position in which it is shown in the drawing, whereupon fluid under pressure flows from the piston chamber 21 by way of the feed groove 120 to the valve chamber 25, and thence by way of the passage 15 and the pipe 14 to the auxiliary reservoir 12, charging this reservoir with fluid at the pressure carried in the brake pipe 6.

When the piston 23 is moved to the release position the slide valve 27 is moved to a position in which a port 122 in the slide valve registers with the end of the emergency reservoir passage 19, while the port 122 in the slide valve is uncovered by the auxiliary valve 28 so that fluid under pressure is supplied from the valve chamber 25 to charge the emergency reservoir 17 with fluid at the pressure carried in the brake pipe.

In the release position of the piston 23 the brake cylinder 8 is connected to the atmosphere through the pipe 9, passage 10, passage 74, the chamber 66, past the open inshot valve 61 to the chamber 62 and to the passage 125, and through a cavity 126 in the slide valve 27 to the atmospheric exhaust passage 128.

Fluid under pressure also flows from the brake pipe 6 and the passage 7 to the piston chamber 41 of the emergency portion 4, and with the piston 40 in the release position as shown in the drawing, fluid flows from the piston chamber 41 through the port 130 to the passage 44 and thence to the quick action chamber 45 and to the emergency slide valve chamber 43.

If it is desired to effect a service application of the brakes a gradual reduction in the brake pipe pressure is made and the triple valve piston 23 is thereby shifted from the release position, thus moving the graduating valve 28 to uncover a service port 135 in the slide valve 27, and to close the port 122. The main slide valve 27 is then moved by the piston 23 until the service port 135 registers with the passage 125.

Fluid under pressure is then supplied to the passage 125 through which it flows to the chamber 62 of the inshot valve device 35, and then past the open inshot valve 61 through the passage 67 to the chamber 66, and through the passage 74 to the passage 10 to which is connected the pipe 9 leading to the brake cylinder.

The chamber 78 on the spring side of the abutment 70 is connected by a passage 138 with an inshot piston volume 140, which is connected with a port in the seat of the slide valve 47 by way of a passage 141. In the release position of the slide valve 47 a cavity 143 in the slide valve connects the passage 141 with a passage 146, which is connected to the passage 110, which leads from the passage 125, so that when fluid under pressure is supplied to the passage 125, and thereby to the brake cylinder 8 in a service application of the brakes, fluid is also supplied from the passage 125 by way of the passage 110, the passage 146, the cavity 143, the passage 141, the volume 140, and the passage 138 to the chamber 78 on the spring side of the abutment 70.

During a service application of the brakes, therefore, the pressure of the fluid on opposite sides of the abutment 70 will be substantially equal, and the spring 77 will operate to maintain the abutment 70 in the position in which the sealing gasket 71 is in engagement with the casing 4, and in which position of the abutment 70 the valve 61 is maintained away from its seat by the stem 75.

Upon a gradual service rate of reduction in the brake pipe pressure the emergency piston 40 is moved so as to shift the auxiliary valve 48 to a position in which a port 151 in the auxiliary valve 48 registers with a port 152 in the main slide valve 47, which port registers with an atmospheric exhaust port 154 in the casing 4. The rate at which fluid under pressure in the valve chamber 43, and in the quick action chamber 45 is reduced by flow of fluid through the port 151 is equal to the rate at which the brake pipe pressure is reduced in effecting a service application, so that if the rate of reduction in brake pipe pressure does not exceed the service rate the piston 40 will not be operated to shift the main slide valve 47 to the emergency application position.

When the brake pipe pressure is increased to effect a release of the brakes the triple valve piston 23 is shifted to the release position, in which position the feed groove 120 is opened to permit the re-charge of the auxiliary reservoir 12 from the brake pipe, and in which the brake cylinder 8 is connected to the atmosphere through the cavity 126 as hereinbefore described.

In addition, when the triple valve piston 23 is shifted to the release position as a result of an increase in the pressure of the fluid in the brake pipe, the chamber 78 on the spring side of the abutment 70 is vented to the atmosphere by way of passage 138, volume 140, passage 141, cavity 143 in the slide valve 47, passage 146, passage 110, passage 125, cavity 126 in the slide valve 27 and the passage 128.

Upon a sudden emergency rate of reduction in brake pipe pressure the triple valve piston 23 is shifted to the application position as in a service application of the brakes, so that fluid under pressure is supplied from the auxiliary reservoir 12 to the brake cylinder 8 as hereinbefore described.

The emergency piston 40 is moved on a sudden reduction in brake pipe pressure so that the auxiliary slide valve 48 is shifted to a position in which the port 159 through the slide valve 47, and which registers with the passage 53 is uncovered by the end of the auxiliary slide valve 48. Fluid under pressure is then supplied from the valve chamber 43 and the quick action chamber 45 through the passage 53 to the piston chamber 51. The quick action piston 50 is thereupon actuated to effect the unseating of the vent valve 56 so that fluid is vented from the brake pipe to the atmosphere by way of the passage 7, the chamber 57 and past the unseated valve 56 to the atmosphere, and as a result of this reduction in brake pipe pressure the emergency piston 40 then moves to the emergency position and moves the main slide valve 47 on its seat.

In the emergency position of the slide valve 47, the cavity 143 connects the passage 19, leading from the emergency reservoir 17, with the passage 146, which connects with the passage 110, which is connected by way of the passage 125 with the chamber 62 of the inshot valve 35. In this position, the slide valve 47 cuts off communication through the passage 141 so as to cut off the flow of fluid to the inshot piston volume 140 and to the chamber 78 on the spring side of the movable abutment 70, so that the chamber 78 remains at atmospheric pressure.

On an emergency application of the brakes fluid under pressure is supplied to the chamber 62 of the inshot valve 35 from both the auxiliary and emergency reservoirs, and fluid flows from this chamber to the brake cylinder by way of the passage 67, and also by way of the retricted passage 68 which lead to the chamber 66, which is in constant communication with the brake cylinder 8 by way of the passage 74 and the passage 10. The rate of flow of fluid to the brake cylinder at this time is determined by the capacity of the passages 67 and 68.

When the pressure of the fluid supplied to the brake cylinder in an emergency application of the brakes has increased to a degree such that the fluid under pressure in the chamber 72, which is constantly connected to the chamber 66, increases to a predetermined value which is sufficient to overcome the pressure of the spring 77 on the opposite side of the abutment 70, assuming that the lever 90 is in the position in which it is shown in Fig. 1 of the drawing, the abutment 70 will be moved to the left against the spring 77 until the seat rib 79 engages the sealing gasket 76 secured between the casing cover section 81 and the body 4. When the abutment 70 moves to this position the stem 75 moves away from the valve 61 and this valve is moved into engagement with the seat rib 64 by the spring 65, thus cutting off the flow of fluid to the brake cylinder by way of the passage 67. This effects a reduction in the rate of flow of fluid from the chamber 62 to the brake cylinder, as fluid thereafter is supplied to the brake cylinder from the chamber 62 only by way of the restricted passage 68.

In an emergency application fluid under pressure supplied from the slide valve chamber 43 to the piston chamber 51 of the vent valve device 33 is gradually vented to the atmosphere by way of a restricted port 160 through the piston 50 so that the pressure of the fluid in the valve chamber 43 and in the quick action chamber 45 is gradually reduced.

The fluid from the slide valve chamber 43 also is present in the chamber 103 of the timing valve device 36, while the pressure of the fluid supplied to the brake cylinder acts on the valve 106 on the opposite side of the diaphragm 102. As a consequence, after a period of time, when the increase in brake cylinder pressure in the passage 110 is sufficient to overcome the reducing quick action chamber pressure in the chamber 103, the diaphragm 102 will be shifted to the left so as to permit the valve 106 to move away from the seat rib 108, thus opening communication from the passage 110 to the chamber 111, and thus by way of the choke or restricted passage 114 to the passage 10 which leads to the brake cylinder. This results in an increase in the rate of supply of fluid under pressure to the brake cylinder 8.

The brake controlling valve device provided by this invention may be controlled, if desired, so as to eliminate the brake cylinder build up delay period. In order to condition the device for this method of operation the lever 90 is rotated in a clockwise direction, as viewed in the drawing, from the position in which it is shown in Fig. 1, to the position in which it is shown in Fig. 3.

During rotation of the lever 90 from the position in which it is shown in Fig. 1 to a point at which the rotor 93 is substantially in the plane of the axis of the lever 90 and the center line of the plungers 87 and 80, the plunger 87 is moved to the right, and its movement is transmitted through the diaphragm 84 to the plunger 80, thus moving this plunger to the right and increasing the degree of compression of the spring 77, and thereby the force exerted by the spring on the movable abutment 70, tending to hold this abutment in the position in which the rib on the sealing gasket 71 engages the casing 4, and in which the stem 75 associated with the abutment 70 maintains the valve 61 out of engagement with the seat rib 64.

On further rotation of the lever 90 the plungers 87 and 80 will be permitted to recede slightly, and when the lever 90 is moved to a position in which the rotor 98 engages the lower face of the wall surrounding the cavity 99 it will be held in this position by the spring 77 acting through the plungers 80 and 87, thus preventing the unintended return of the lever to the position in which it is shown in Fig. 1 of the drawing.

With the lever 90 in the position in which it is shown in Fig. 3 of the drawing, on a sudden emergency rate of reduction in brake pipe pressure the triple valve piston 23 and the emergency piston 40 will be shifted to the application position as described above, and fluid under pressure will be supplied from the auxiliary reservoir 12 and the emergency reservoir 17 to the chamber 62 in the inshot valve 35. Fluid will thereupon be supplied from the chamber 62 to the brake cylinder 8 by way of the passage 67 and the restricted passage 68 which communicate with the chamber 66. Fluid under pressure will also be supplied from the chamber 66 to the chamber 72 on the right hand face of the abutment 70, but because of the increased force exerted on this abutment by the spring 77 and opposing its movement by fluid under pressure in the chamber 72, the abutment will not be moved, but will remain in the position in which it is shown and will maintain the valve 61 away from the seat 64. Fluid will, therefore, continue to be supplied to the brake cylinder at the same rate as it was initially supplied to the brake cylinder.

In a preferred construction, when the lever 90 is moved to the position in which it is shown in Fig. 3 of the drawing, the degree of compression of the spring 77 is increased sufficiently so that the abutment 70 will not be moved by fluid under pressure in the chamber 72 of a value less than that which is normally operative to effect unseating of the valve 106, and the degree of compression of the spring 77 and may be increased to such a value as to maintain the abutment 70 in the position in which it is shown in Fig. 1 of the drawing even when pressure of the fluid supplied to the brake cylinder is at a maximum.

The brake controlling valve device provided by this invention may be restored to normal operation when desired, by rotating the lever 90 in a counterclockwise direction from the position in which it is shown in Fig. 3, to the position in which it is shown in Fig. 1 of the drawing. This permits the plungers 80 and 87 to move to the left until the head 89 on the plunger 87 engages the casing section 85, thereby reducing the degree of compression of the spring 77.

From the foregoing it will be seen that the brake equipment provided by my invention has optionally operable means for cutting out the inshot valve during an emergency application of the brakes so that this valve is not effective to produce a restriction in the rate of fluid to the brake cylinder.

While one embodiment of the invention has been illustrated and described in detail, it should be understood that the invention is not limited to these details of construction, and that numerous modifications and changes may be made without department from the scope of the following claims.

Having now described my invention, what I claim as new and desire to secure by Letters Patent, is:

1. In a fluid pressure brake, in combination, a brake pipe, a brake cylinder, a brake controlling valve device operated upon a reduction in brake pipe pressure for supplying fluid under pressure to the brake cylinder, valve means controlling a communication through which fluid under pressure is supplied to the brake cylinder, control means subject to the opposing pressures of the fluid supplied to the brake cylinder and of a spring and controlling said valve means, and means to adjustably vary the pressure exerted on said means by said spring, said control means being adapted in response to a predetermined increase in the pressure of the fluid supplied to the brake cylinder in one adjustment of the spring to operate the valve means to effect a reduction in the rate of flow of fluid to the brake cylinder, and being adapted in another adjustment of the spring to be inoperative in response to said predetermined increase in the pressure of the fluid supplied to the brake cylinder to operate the valve means to effect a reduction in the rate of flow of fluid to the brake cylinder.

2. In a fluid pressure brake, in combination, a brake pipe, a brake cylinder, a brake controlling valve device operated upon a reduction in brake pipe pressure for supplying fluid under pressure to the brake cylinder, valve means controlling a communication through which fluid under pressure is supplied to the brake cylinder, means subject to and operated upon a predetermined increase in the pressure of the fluid supplied to the brake cylinder for operating said valve means to effect a reduction in the rate of flow of fluid to the brake cylinder by way of said communication, other valve means controlling a communication through which fluid under pressure is supplied to the brake cylinder, means normally operated upon a higher predetermined increase in the pressure of the fluid in the brake cylinder for operating said valve means to permit the supply of fluid to the brake cylinder by way of said communication, and optionally operable means to render the first named valve means ineffective to reduce the rate of flow of fluid to the brake cylinder.

3. In a fluid pressure brake, in combination, a brake pipe, a brake cylinder, a brake controlling valve device operated upon a reduction in brake pipe pressure for supplying fluid under pressure to the brake cylinder, valve means controlling a communication through which fluid under pressure is supplied to the brake cylinder, means subject to and operated upon a predetermined increase in the pressure of the fluid supplied to the brake cylinder for operating said valve means to effect a reduction in the rate of flow of fluid to the brake cylinder by way of said communication, other valve means controlling a communication through which fluid under pressure is supplied to the brake cylinder, means normally operated upon a higher predetermined increase in the pressure of the fluid in the brake cylinder for operating said other valve means to permit the supply of fluid to the brake cylinder by way of said communication, and optionally operable means to render the fluid pressure operated means associated with the first named valve means ineffective to operate said valve means to effect a reduction in the rate of flow of fluid to the brake cylinder.

4. In a fluid pressure brake, in combination, a brake pipe, a brake cylinder, a brake controlling valve device operated upon a reduction in brake pipe pressure for supplying fluid under pressure to the brake cylinder, valve means controlling a communication through which fluid under pressure is supplied to the brake cylinder, means subject to and operated upon a predetermined increase in the pressure of the fluid supplied to the brake cylinder for operating said valve means to effect a reduction in the rate of flow of fluid to the brake cylinder by way of said communication, other valve means controlling a communication through which fluid under pressure is supplied to the brake cylinder, means normally operated upon a higher predetermined increase in the pressure of the fluid in the brake cylinder for operating said other valve means to permit the supply of fluid to the brake cylinder by way of said communication, and optionally operable means to render the fluid pressure operated means associated with the first named valve means ineffective to operate said valve means to effect a reduction in the rate of flow of fluid to the brake cylinder in response to fluid pressures less than that normally operative to operate the fluid pressure operated means associated with the second named valve means to operate said valve means to permit the flow of fluid to the brake cylinder.

5. In a fluid pressure brake, in combination, a brake cylinder, a brake controlling valve device operative to supply fluid under pressure to the brake cylinder, a valve for controlling a communication through which said brake controlling valve device supplies fluid to the brake cylinder, a spring, a movable abutment subject to the opposing pressures of the brake cylinder and said spring for normally holding said valve in open position and operated upon an increase in brake cylinder pressure sufficient to overpower the pressure of the spring to effect the closure of said valve, and manually controlled means for varying the pressure of the spring on said abutment.

6. In a fluid pressure brake, in combination a brake cylinder, a brake controlling valve device for controlling the supply of fluid under pressure to the brake cylinder, a spring, a valve device subject to the opposing pressures of the brake cylinder and said spring for controlling a communication through which said brake controlling valve device supplies fluid to the brake cylinder, and manually controlled means for varying the pressure of said spring on said abutment comprising a movable member engaging said spring, a rotatable element including an arm, and a roller carried by said arm and engaging said member, whereby the rotation of said arm causes the roller to move said member so as to increase the compressive force of the spring on said abutment.

SIDNEY G. DOWN.